(12) United States Patent
McMurtry

(10) Patent No.: US 7,165,335 B2
(45) Date of Patent: Jan. 23, 2007

(54) METHOD OF SCANNING AN OBJECT

(75) Inventor: David Roberts McMurtry, Dursley (GB)

(73) Assignee: Renishaw PLC, Gloucestershire (GB)

( * ) Notice: Subject to any disclaimer, the term of this patent is extended or adjusted under 35 U.S.C. 154(b) by 0 days.

(21) Appl. No.: 10/523,687

(22) PCT Filed: Aug. 29, 2003

(86) PCT No.: PCT/GB03/03738

§ 371 (c)(1),
(2), (4) Date: Feb. 3, 2005

(87) PCT Pub. No.: WO2004/020939

PCT Pub. Date: Mar. 11, 2004

(65) Prior Publication Data

US 2006/0037208 A1     Feb. 23, 2006

(30) Foreign Application Priority Data

Aug. 30, 2002   (GB)   ................................. 0220158.0

(51) Int. Cl.
*G01B 5/004*   (2006.01)
(52) U.S. Cl. ..................................... 33/503
(58) Field of Classification Search ................ 33/503, 33/549, 551, 553, 554, 555
See application file for complete search history.

(56) References Cited

U.S. PATENT DOCUMENTS

| | | | |
|---|---|---|---|
| 3,345,613 A | 10/1967 | Bucholtz et al. | |
| 4,342,050 A | 7/1982 | Traino | |
| 4,483,079 A * | 11/1984 | Band et al. | 33/503 |
| 4,692,603 A | 9/1987 | Brass et al. | |
| 4,901,256 A * | 2/1990 | McMurtry et al. | 33/503 |
| 5,088,046 A | 2/1992 | McMurtry | |
| 5,373,222 A * | 12/1994 | Hemmerle et al. | 33/504 |
| 5,377,011 A | 12/1994 | Koch | |
| 5,402,462 A | 3/1995 | Nobuta | |
| 5,733,126 A | 3/1998 | Andersson et al. | |
| 6,327,788 B1 * | 12/2001 | Seddon et al. | 33/551 |
| 2002/0013918 A1 | 1/2002 | Swoboda et al. | |

FOREIGN PATENT DOCUMENTS

| | | |
|---|---|---|
| EP | 0 357 190 A2 | 3/1990 |
| EP | 0 565 738 A1 | 10/1993 |

\* cited by examiner

Primary Examiner—Christopher W. Fulton
(74) Attorney, Agent, or Firm—Oliff & Berridge, PLC

(57) ABSTRACT

A method of scanning an object is disclosed comprising the steps of providing a scanning device having a probe and a sample holder whereby the sample holder is rotatable relative to the probe, providing a first feature for indicating the start and/or end of a scan, and recognising the first feature whereby when the first feature is recognised the scanning device is ready to start or end a scan. The scanning device may have a fixed stop which comprises the first feature alternatively, the first feature is provided on the scanning device or on the object. A second feature, located on the scanning device or object for example, may be provided wherein the first feature indicates the start of a scan and the second feature indicates the end of the scan. Also disclosed is an apparatus for scanning an object.

15 Claims, 3 Drawing Sheets

METHOD OF SCANNING AN OBJECT

This invention relates to a method of scanning an object.

One method, which may be used with circular or helical scans, is to begin the scan at a manually determined position and end the scan when the distal end of the object is reached, perhaps determined when the rotational axis is reached. A problem with this method is that it can require complicated set-up to ensure that the whole object surface is scanned which is time consuming.

According to a first aspect of the present invention there is provided a method of scanning an object comprising the steps of:
- providing a scanning device having a probe and a sample holder whereby the sample holder is rotatable relative to the probe;
- providing a first feature for indicating the start and/or end of a scan; and
- recognising the first feature whereby when the first feature is recognised the scanning device is ready to start or end the scan.

The first feature is recognised by a control device provided in the scanning device or connected thereto.

In a preferred embodiment, the scanning device has a fixed stop which defines a known relationship between or relative position of the probe and sample holder. Preferably, the fixed stop comprises the first feature. Thus, when the scanning device is at the fixed stop, the first feature is recognised i.e. the fixed stop constitutes the start or end of a scan.

In one embodiment, the fixed stop is returned to after the completion of a scan, or when the scanning device is switched on therefore, the fixed stop denotes the start of a scan. In this embodiment, once the sample is located on the sample holder, mere verification that the parts of the scanning device are at the fixed stop is necessary for recognition of first feature.

When the first feature indicates the start of a scan and, on recognition of the first feature the scanning device is ready to start a scan, the method preferably further comprises the steps of providing a second feature for indicating the end of the scan and recognising the second feature whereby when the second feature is recognised the scanning device is ready to end the scan.

The method according to the invention allows automatic determination of the start and/or the end of a scan and thus enables semi or unmanned operation and potentially automatic start up/switch-off of motor drives used in the scanning process.

According to a second aspect the invention provides an apparatus for scanning an object comprising:
- a scanning device having a probe and a sample holder whereby the sample holder is rotatable relative to the probe; and
- a control device for controlling relative motion between the probe and sample holder and for recognising a first feature whereby the control device starts and/or ends a scan on the basis of recognising the first feature.

Preferably, the control device includes a computer programme which recognises the first feature.

According to a third aspect the invention provides a computer programme for use with a scanning device having a probe and a sample holder whereby the sample holder is rotatable relative to the probe and whereby the computer programme includes recognition information indicative of a first feature whereby the computer programme compares data from a scanning procedure with the recognition information and when the data substantially coincides with the recognition information the programme signals the start or end of a scan.

The recognition information may be as simple as a contact occurring between the probe tip and a surface within a certain plane; or the probe tip reaching a defined co-ordinate; or the probe tip movement describing a certain profile.

The invention will now be described by way of example and with reference to the accompanying drawings, of which:

Figure 1:
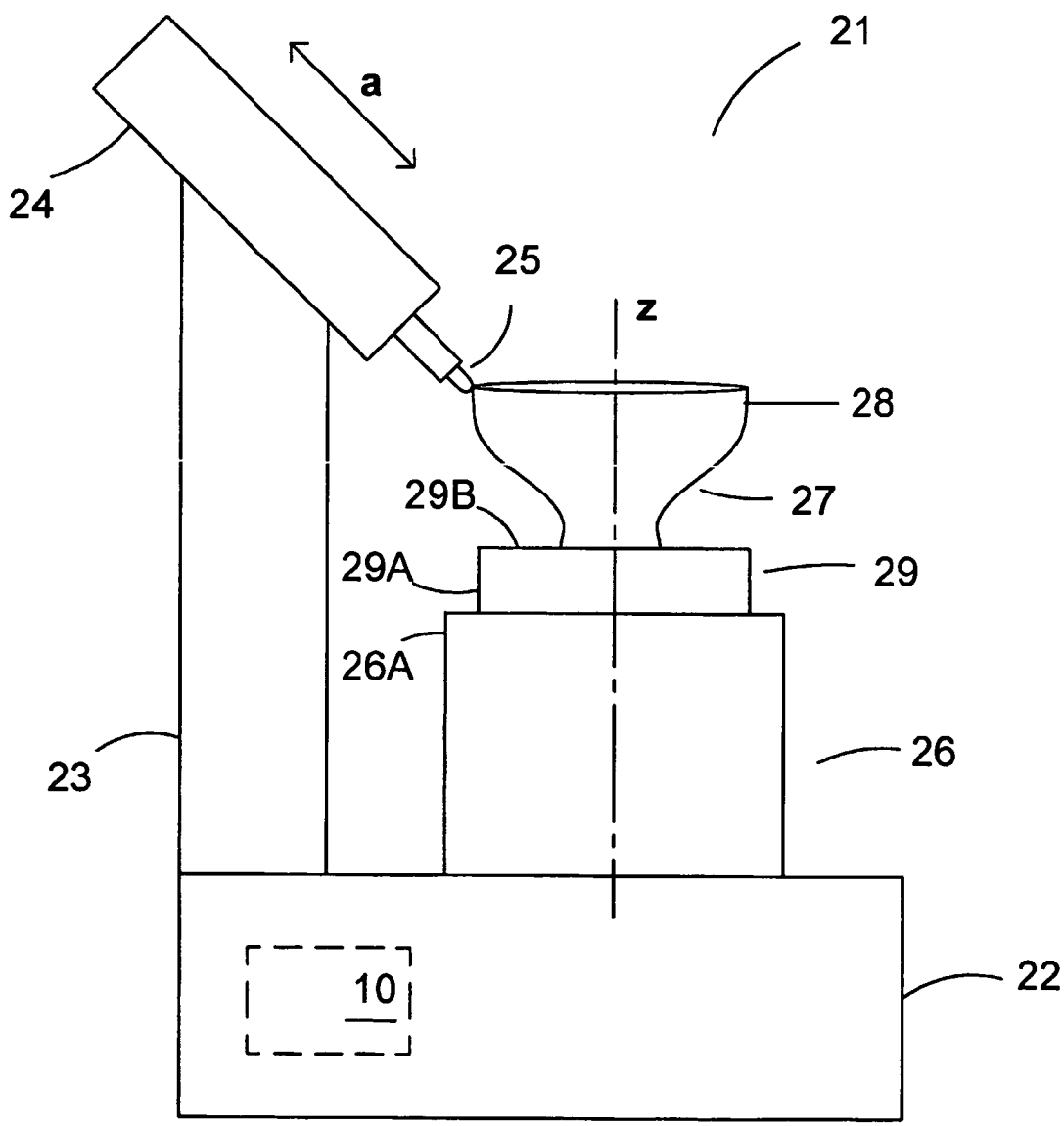
FIG. 1 shows a scanning device which is suitable for use with the method of the invention.

FIG. 1 shows a scanning device 21 having a base 22 and a back portion 23 which has an LVDT probe 24 attached thereto. The probe has a scanning tip 25 which is movable along an axis designated by the letter a in this case axis a is at 45° to a vertical axis z. Mounted on the base 22 is a sample holder 26 onto which an object 27 may be placed for scanning. The object 28 may be located in a fixture 29 prior to being mounted on the sample holder 26. The probe 24 and the sample holder 26 are relatively movable along axis z and the sample holder 26 is rotatable about axis z. The scanning device 21 includes a control device 10 for controlling the relative movement of the probe 24 and sample holder 26.

In one embodiment, a start (or first) feature is provided by or on the sample holder, for example, it is provided by the side surface 26A of the sample holder 26. If a fixture 29 is used, the side 29A or upper surface 29B could provide the first feature. In these cases, it is advantageous if the sample holder 26 and fixture 29 are circular in cross-section as it can then be established where along both the z and a axes the particular feature lies. This in turn enables the probe tip 25 to move rapidly towards the first feature then, on deflection of the probe tip at an expected co-ordinate the start feature is recognised and, the probe movement is either paused or changed enabling motion according to a predetermined scanning routine. Pausing the motion enables an operator to double check that the feature has been found, or allows for stabilisation of external influences such as thermal conditions.

Advantageously, the scanning device is designed such that when it is at a fixed stop, the probe automatically encounters the start feature. The device is programmed to return to a fixed stop at the end of a scan and the relative position of the probe tip and sample holder at this fixed stop is manipulated so that when a fixture or sample is located on the sample holder, the probe tip is located at or on the first feature ready to begin the scan. In order to facilitate location of a sample or fixture on the sample holder, either the probe is retracted away from the sample holder or, the sample slides into position on the sample holder. When a scan is initiated, the position of the vertically movable part of the device is confirmed along with the probe tip reading. If both these readings indicate that the probe tip is in contact with the first feature, the device is ready to begin to scan the object.

Once the scan has started, the sample holder and probe move relatively along the z-axis. The probe follows a helical or spiral path along the sample surface until the sample has been scanned. At this point, as it meets no resistance, the probe tip moves towards the rotational axis of the sample holder. The second feature may thus be defined as the probe reaching the rotational axis (z) of the sample holder.

Alternatively, a start feature may be provided by the sample. Referring now to, FIG. 3, the sample 30 is solid i.e. does not have a hollow centre. In this case, the start feature 32 is provided by the surface of the sample which is distal to the sample holder 38 or fixture (not shown). It is convenient that the sample is located approximately centrally on the rotational axis of the sample holder. The probe tip is simply located on the rotational axis at a set height above the sample holder. The probe tip and/or sample holder are moved towards each other until the tip contacts the sample. This contact causes a deflection of the probe tip on the rotational axis of the sample holder which designates the first feature thus, the start feature is recognised and the probe is ready to start a scan.

In a further embodiment, the start feature is provided at a set height (or co-ordinates) above the sample holder. In this embodiment, the scan is initiated prior to contact between the sample and probe tip which allows for rapid relative movement of the probe and sample holder to a location close to the contact point (the set height) and safeguards the probe from damage which can occur if it contacts a surface whilst moving quickly.

The second feature, which denotes the end of a scan may be provided by the sample holder (e.g., by side surface 38A of the sample holder 38), fixture or sample. When the second feature is recognised, by reaching certain co-ordinates or the probe tip describing a certain characteristic shape, the probe moves rapidly to a standby location to await further instructions.

When the scan starts at or near the top of a sample, the probe tip moves towards the sample holder during the scan. If the sample, fixture or sample holder has a certain characteristic profile, this can be used as the second feature (see FIG. 2 for a more detailed explanation).

For example, if the sample holder has a known diameter, the second feature could be the reaching of an a-axis coordinate that relates to this diameter. An actual physical feature such as a lip to the sample holder or the fixture could also be provided creating a more complex first feature which provides greater assurance that the feature is recognised.

Alternatively, a datum stop may be used for the second feature. Before starting the scan, the relative positions of the probe and object at the end of the scan are established in the z-direction. The probe is then either returned to the start position (if it has been previously recognised) or instructed to find the start of the scan, the object is then scanned until the z-axis location at the end of the scan is reached, at which point the scan is complete.

If a fixture is used, it is important that the sample sits sufficiently proud of the fixture so that all of the sample surface that is required can be scanned.

Figure 2:
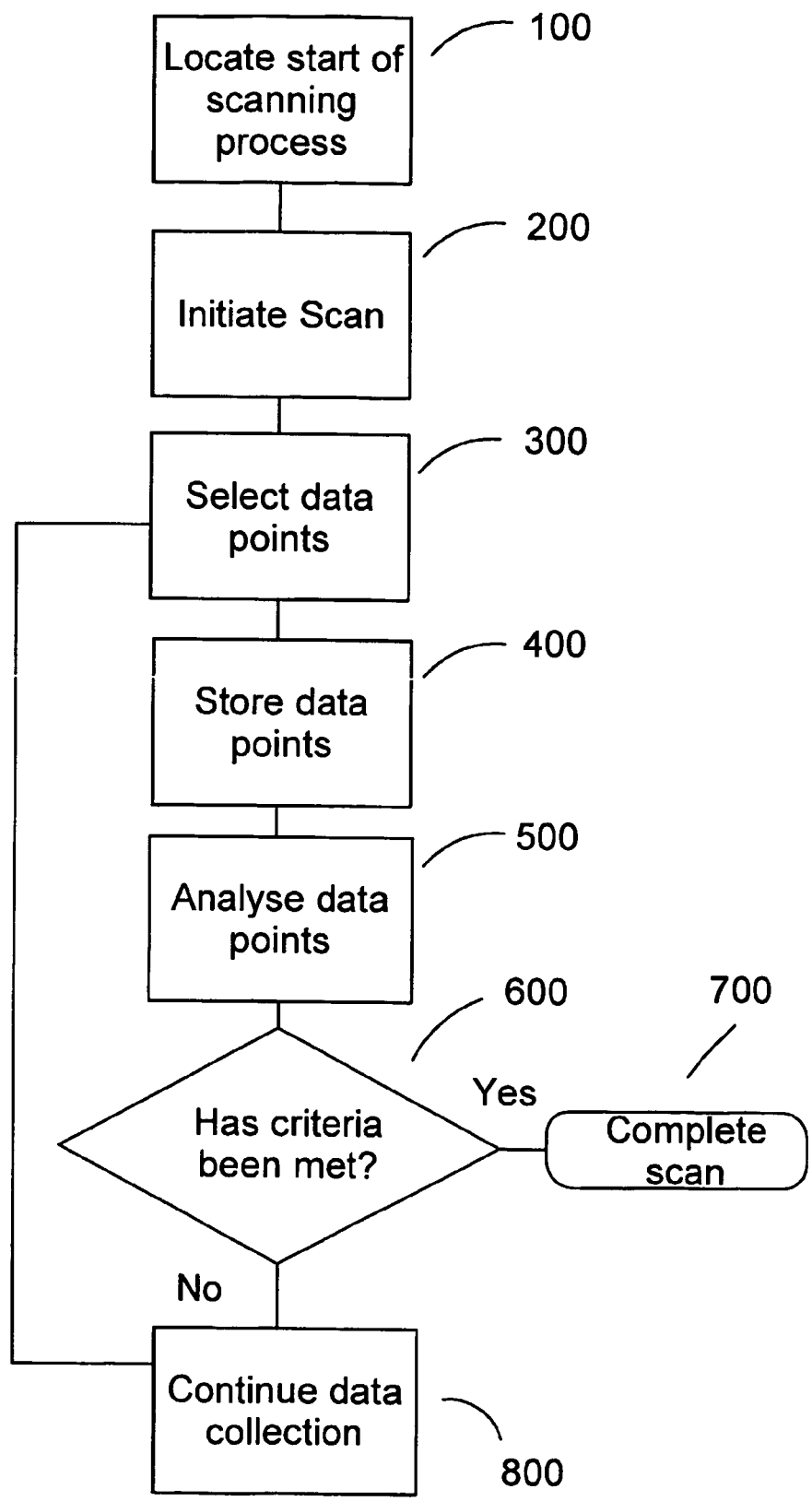
FIG. 2 is a flow diagram showing different steps according to an embodiment of the invention.

FIG. 2 shows a flow diagram which details the different steps of an embodiment of the invention.

A start of the scanning process 100 is located as described previously with respect to FIG. 1.

The scan is initiated 200 and the probe and object are moved relatively along the scan line. Data is selected 300 from the scan and optionally stored 400. The selected data is then analysed 500 and compared with criteria 600 or recognition information which determine when the scan ends 700. Until the criteria are met, the scan and data collection continues 800. When the criteria are met, the control device recognises the second feature and is ready to end the scan. These steps are carried out within the scanning device or, in a separate controller.

This embodiment will be discussed in relation to the surface of a sample which is distal the sample holder being the first feature, thus the start is defined as lying on the centre of rotation of the sample holder 26. The person skilled in the art will appreciate that the other start positions discussed are alternatives.

The object 27 should to be aligned on the centre of rotation with a reasonable degree of accuracy as the probe has a zone in which it will be most accurate which tends to be away from the limits of its motion; the processing means which converts data points from a scan into a three-dimensional model often uses the rotational axis as a reference so analysis of selected data is simplified; and the stability of an object on the sample holder is increased. A certain amount of misalignment, for example if an object is centred by eye, will not affect the accuracy of results indeed, an object may be placed near the circumference or edge of the sample holder however, this is less desirable.

For the purposes of one embodiment for determining the end of a scan the absolute position along the rotational axis is not important, however the relationship of different pieces of data on this axis is important as will be described later.

Next, the scan 200 of an object 27 begins. Various data points which are captured during the scan are selected 300 based on predetermined requirements and analysed. The selected data 300 may be temporarily stored until the scan is complete. If the start point is considered as the centre of the circle lying in a plane perpendicular to the z-axis then, for example, one data point for every 10° of rotation around that circle may be selected however, this may be increased to every degree or two data points per degree if required. All data captured during the scan could, in theory, be selected but this may increase processing time for determining whether the end of the scan has been reached.

As the scan continues, data points which are from the same orientational direction are stored in association with each other such that their relative positions along the z axis are maintained. For example, this could be as a table with the orientational direction along one side and the order of data capture along the other. In this manner, a plurality of splines of data are created.

The data points once stored are analysed 500 and compared with previous data within the set to determine if the criteria have been met 600. This occurs during the scanning process to enable automatic determination of the end of the scan without post-processing of the data. As the data points within a set all lie on an orientational direction the (x,y) coordinates of the data points can be converted into a distance from the origin on that direction (a radial distance). Changes in this distance reading or even when the distance becomes constant are used to set the criterion for whether the end of a scan has been reached.

Referring to FIG. 1, if the scan begins at the bottom of the object 27 i.e. at the surface of the sample holder 26 or fixture 29 if used, the criteria for the end of scan would be when the distance remained constant for two data points within each set, i.e. when the probe tip 5 had reached point 28. The fact that the distance had decreased and subsequently increased earlier on in the scan is not important in determining the end of the scan.

If the scan began at the top of the object 27 a suitable criteria would be when the data sets increased on two subsequent rotations following a minimum distance from the origin being attained.

The criteria for determining the end of a scan may be set as any number of completed circles which lie in a plane perpendicular to the z-axis achieving either the desired change or consistency of distance from the origin. Certainly at least two is recommended in order that the surface deviations do not cause premature cessation of a scan. Also, due to non-symmetry of some objects, it is preferred that criteria are set which includes that compliance of a certain number of the data sets with the distance criterion is required. For example when 95% of the sets of data meet the distance criteria as otherwise a scan could continue indefinitely and require manual termination.

Once the criteria have been met, the scan is complete 700. Reaching the end of the scan could be used to trigger a return to a stand-by position for the probe and sample holder followed by switching off the motors that control the relative motions during the scan. Of course, for the device 21 of FIG. 1, the scan could be controlled by a single motor in which case the sample holder would describe a helical path during the scanning process. Alternatively, the probe remains at the complete location for operator verification that the scan is complete.

As an alternative to determining the change or consistency in distance of the data for each orientational direction from the origin or when a change in direction of this distance has occurred, the information could be used to determine the change in gradient of the slope of each spline. A person skilled in the art would appreciate that there are other techniques that can be used.

Figure 3:
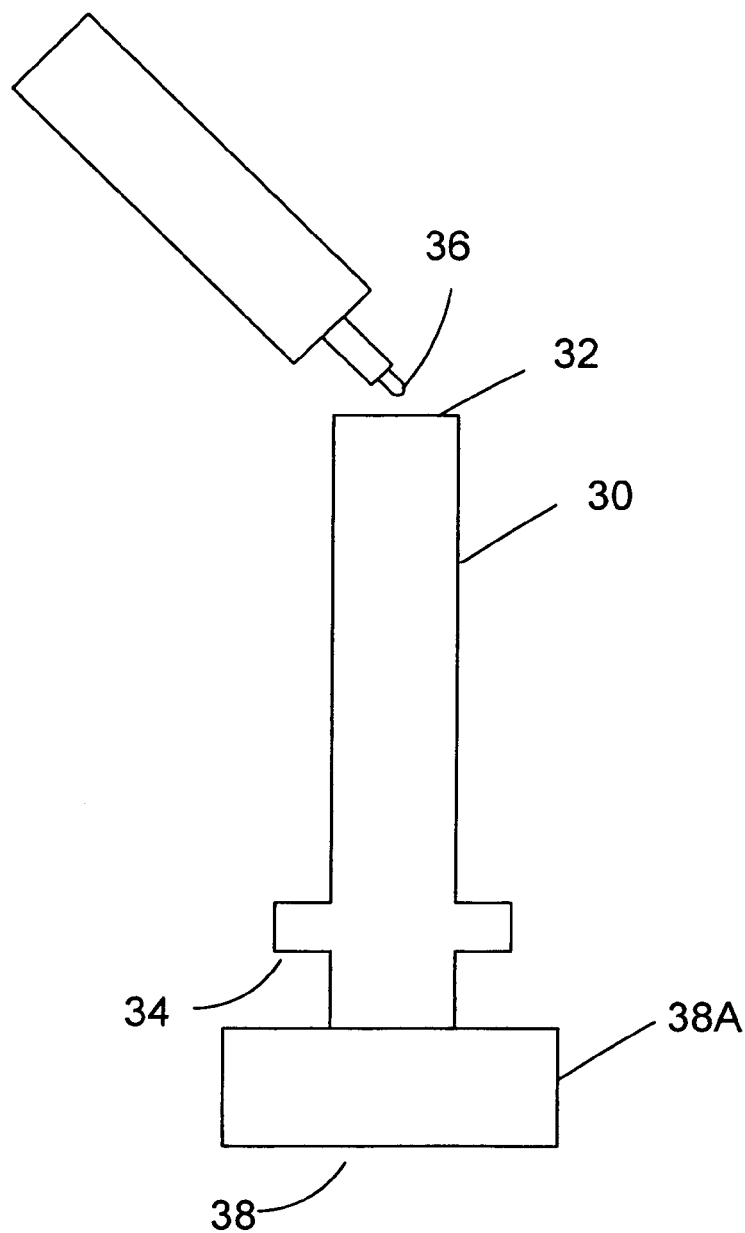
FIG. 3 shows a cross section through an object suitable for being scanned according to the invention.
Figure 4:
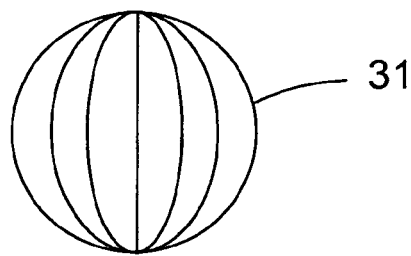
FIG. 4 shows diagrammatically how data from a scan is selected.

FIG. 3 shows a cross section through a turbine blade 30 which will undergo a scanning process according to the invention. As the turbine blade 30 is scanned (not shown) data points from certain predetermined orientational directions from the defined origin of the scan are selected from all the data captured during the scan. Referring now to FIG. 4, these splines of data can be visualised as being lines of longitude 31 on the surface of a globe which has the location of start of scan at a pole.

Analysis of the data produces a distance measurement from the origin or start which is compared to previous measurements in that data set and the criteria of an end of scan to determine whether such an end has been reached.

For certain objects which have irregular shapes, it can be difficult to mount the object on a sample holder in such a way that all parts of the surface of the object are accessible during scanning. This is illustrated by an undercut 34 which does not allow the probe tip 36 to accurately scan this part of the blade 30 as the tip 36 is prevented from touching the surface by an overhang.

This problem is also encountered in samples having re-entrant points, for example, where there is a hollow in the surface. The re-entrancy or hollow could be undetected, resulting in an incomplete scan. This would mean that an article manufactured based on the scan would be inaccurate and possibly unusable. If however, during the scan, selected data points are collected and analysed by, for example conversion to distances from the origin along splines (see FIG. 4 reference number 31), re-entrant points or hollows which are of a significant size (greater than the size of the probe tip) can be identified during the scan enabling realignment of the object immediately. This is because the re-entrant region would show up as a reduction in the distance from the origin and is likely to occur for a number of selected data points and for a number of rotations of the sample holder. Thus, there would be an inconsistency when compared with other data proximate to that region. It is unlikely that such a re-entrancy would stop a scan as less than the proportion of data sets required would meet the criteria but it could be indicated to an operator as a potential problem. One way this could be achieved is by visualising the splines of data on a monitor, the colour could change when a change in direction of the distance is detected.

If such a re-entrant point is detected then the scan may be stopped for realignment of the object or if it is not discovered until the end of the scan the operator could, by quickly checking the results, establish that a point of re-entry did occur and redo the scan thus preventing manufacture of inaccurate components.

Referring now to FIG. 3, the end of a scan which starts at or near the top of the blade would be defined by the criteria that 90 or 95% of the sets of data would go through a maxima of radial distance from the origin followed by a reduction to a constant distance, i.e. the distances of data points gradually increases then decreases and finally holds steady for a number of revolutions of the sample holder. At this point, the scan has reached the foot portion of the blade.

The invention can be applied to the scanning any of object for the purposes of producing a reproduction or digital representation thereof, examples include objects used in aerospace, transport, medical applications such as replacement joints and dentalware (for example copings), furniture, containers such as bottles and leisure goods.

Although the examples have been described using a contact scanning device, the invention is equally applicable to use with non-contact devices such as laser probes. In this case, in addition to the above described features, marks having different optical properties to surrounding material could be used.

The use of features as hereinbefore described enables automatic start and optionally an automatic termination of a scanning procedure without time consuming and difficult machine set up.

The invention claimed is:

1. A method of scanning an object comprising the steps of:
   providing a scanning device having a probe and a sample holder whereby the sample holder is rotatable relative to the probe;
   providing a first feature for indicating the start and/or end of a scan; and
   recognising the first feature whereby when the first feature is recognised the scanning device is ready to start or end the scan.

2. A method according to claim 1 wherein, the scanning device has a fixed stop which defines a known relationship between the probe and the sample holder.

3. A method according to claim 2 wherein, the fixed stop comprises the first feature.

4. A method according to claim 3 wherein, the fixed stop indicates the start of a scan.

5. A method according to claim 1 wherein, the first feature is provided on the scanning device.

6. A method according to claim 5 wherein, the scanning device further comprises a fixture for at least partially housing an object.

7. A method according to claim 1 wherein, the first feature is provided on the object.

8. A method according to claim 1 wherein, the first feature indicates the start of a scan and on recognition of the first feature the scanning device is ready to start a scan and the method further comprises the steps of:
   providing a second feature for indicating the end of the scan; and
   recognising the second feature whereby when the second feature is recognised the scanning device is ready to end the scan.

9. A method according to claim 8 wherein, the second feature is provided on the scanning device.

10. A method according to claim 9 wherein, the scanning device further comprises a fixture for at least partially housing an object.

11. A method according to claim 8 wherein, the second feature is provided on the object.

12. A method according to claim 8 wherein, the second feature comprises a datum stop.

13. A method according to claim 8 wherein, a scan automatically starts or ends when the scanning device recognises the first feature.

14. A method according to claim 8 wherein, a scan automatically ends when the scanning device recognises the second feature.

15. An apparatus for scanning an object comprising:
- a scanning device having a probe and a sample holder whereby the sample holder is rotatable relative to the probe; and
- a control device for controlling relative motion between the probe and sample holder and for recognising a first feature whereby the control device starts and/or ends a scan on the basis of recognising the first feature.

* * * * *